Aug. 3, 1965  E. ORSHANSKY, JR  3,198,289
RAILWAY TRUCK BRAKE
Filed Sept. 1, 1960  4 Sheets-Sheet 1
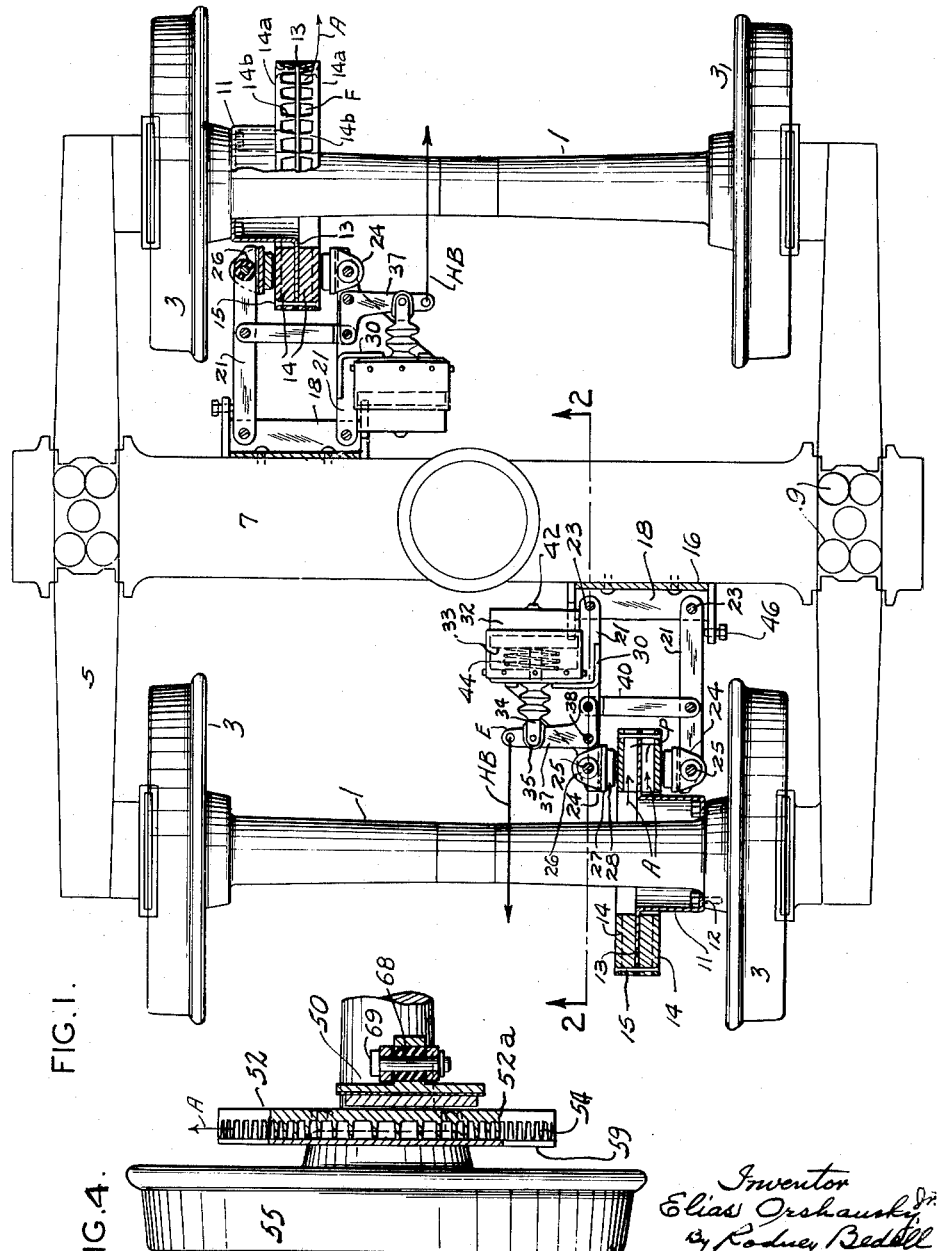

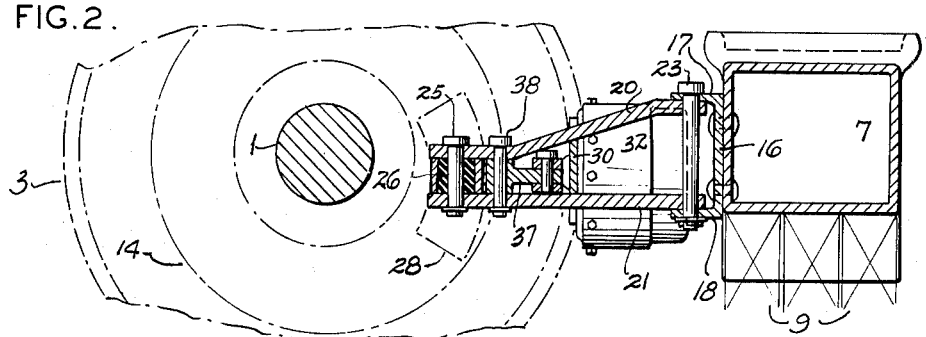
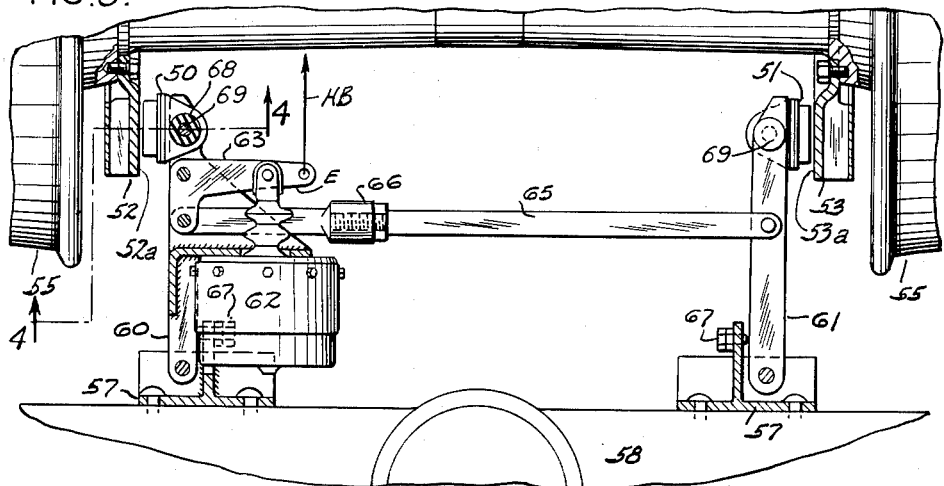
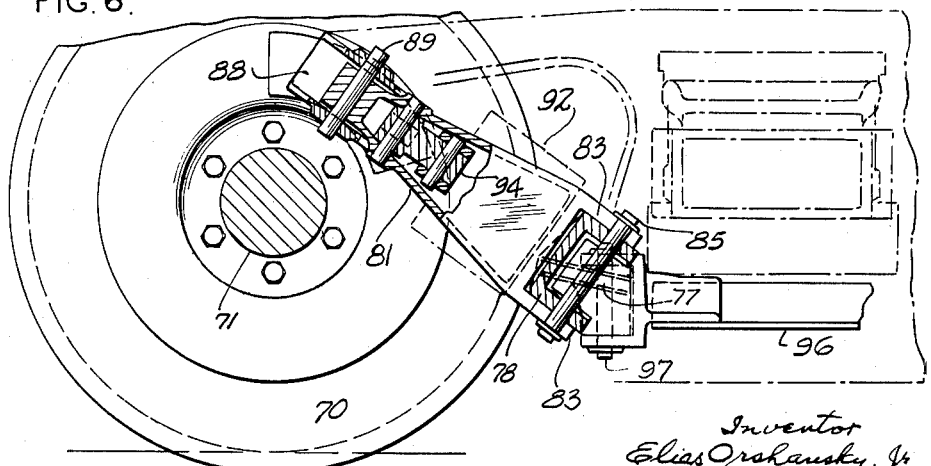

Aug. 3, 1965  E. ORSHANSKY, JR  3,198,289
RAILWAY TRUCK BRAKE
Filed Sept. 1, 1960  4 Sheets-Sheet 4

Inventor
Elias Orshansky, Jr.
By Rodney Bedell
atty.

United States Patent Office 3,198,289
Patented Aug. 3, 1965

3,198,289
RAILWAY TRUCK BRAKE
Elias Orshansky, Jr., Los Angeles, Calif., assignor, by mesne assignments, to American Seal-Kap Corporation of Delaware, New York, N.Y., a corporation of Delaware
Filed Sept. 1, 1960, Ser. No. 53,427
3 Claims. (Cl. 188—59)

The invention relates to brakes for railway trucks and comprises a brake gear arrangement which can be applied as a self-contained unit to a railway truck. The invention also comprises the combination of truck parts with the brake arrangement.

Among the general objects of the invention are the reduction in the number of brake parts required and the resulting simplification of the brake system; adapting the brake for application to the usual truck construction, either in a new truck or as a substitution for a brake arrangement in an existing truck, without addition to or change in truck structures in general use. In some respects the present invention is an improvement upon that shown in application Serial No. 812,461, filed May 11, 1959 (now Patent 3,024,872), by the present applicant and other inventors, but in the present structure only a single operating cylinder is associated with the brake parts for each axle, and the brake parts associated with one axle function independently of the brake parts associated with the other axle. This is one example of reduction in parts and simplification effected by the present invention.

Other detail objects of the invention will appear from the following description and the accompanying drawings, in which:

FIGURE 1 is a top view of a four-wheel truck embodying one form of the invention, with parts sectioned on the horizontal plane of the wheel axis.

FIGURE 2 is a vertical longitudinal section on line 2—2 of FIGURE 1.

FIGURE 3 is a top view of a portion of a railway four-wheel truck embodying another form the invention.

FIGURE 4 is a vertical section and view on line 4—4 of FIGURE 3.

Figure 5:
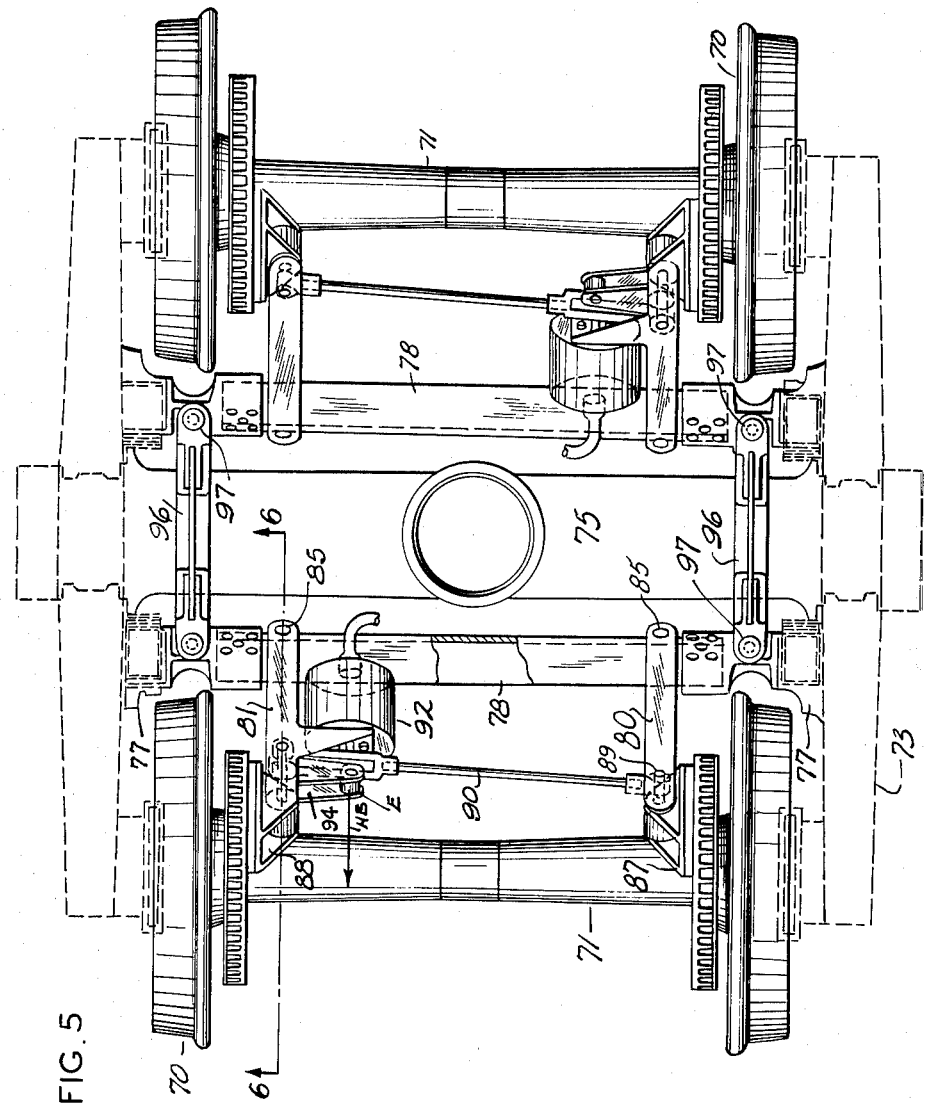
FIGURE 5 is a top view of a truck but illustrates a third form of the invention.

FIGURE 6 corresponds to FIGURE 2 but illustrates the structure shown in FIGURE 5, and is taken on line 6—6 of FIGURE 5.

Figure 7:
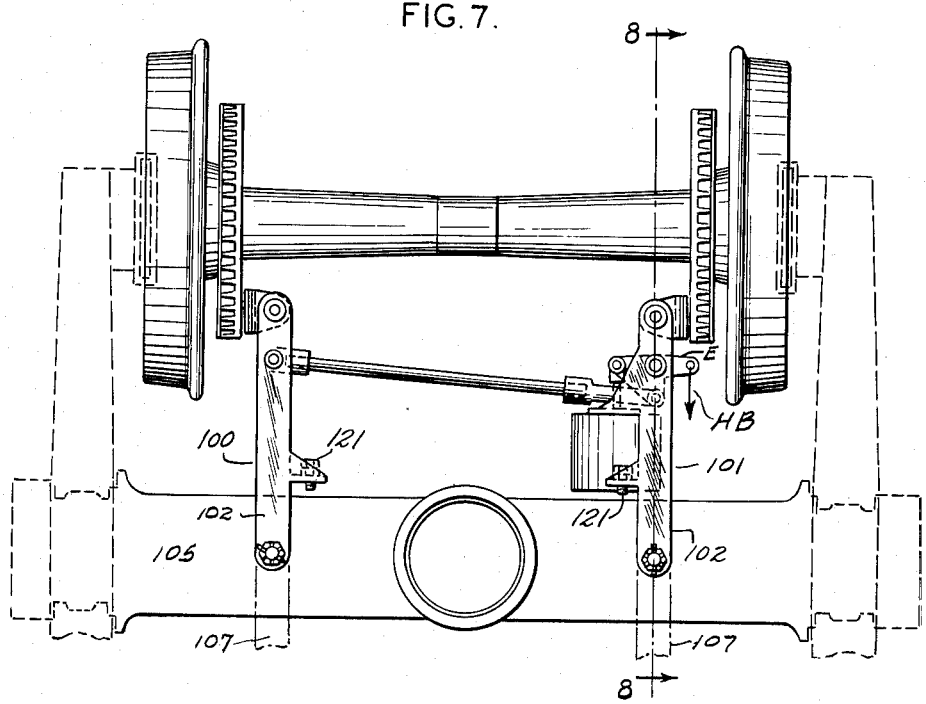

FIGURE 7 is a top view of a longitudinal half of a four-wheel truck and illustrates a fourth form of the invention.

Figure 8:
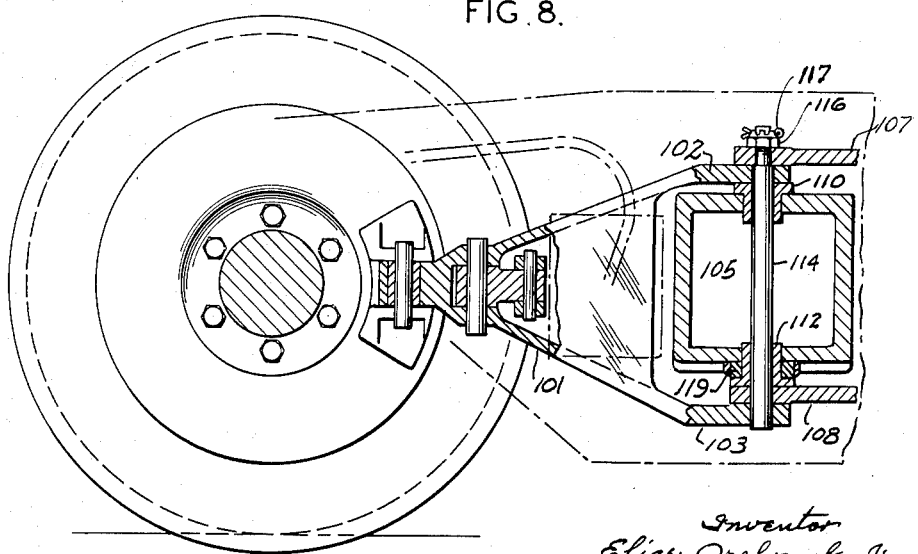

FIGURE 8 corresponds to FIGURES 2 and 6 but illustrates the form of the invention shown in FIGURE 7, and is taken on line 8—8 of FIGURE 7.

The truck shown in FIGURES 1 and 2 has the usual axles 1 with wheels 3 fixed thereon, side frames 5 and a bolster 7 extending transversely of the truck from side frame to side frame and supported on the latter by springs 9 in the usual manner. Secured to one wheel on each axle and in fixed relation to the same is a drum 11 provided with a bolting flange 12 at one end and a disk flange 13 at the other end. Annular members 14 are applied to opposite sides of flange 13 and are secured to each other and the flange by rivets 15. Each member comprises a smooth face 14a and a ribbed face 14b. The ribbed faces oppose flange 13 and form therewith narrow passages P each opening toward the wheel axis and periphery and providing for the circulation of air to dissipate heat generated by braking operations. The rotation of the disk tends to set up centrifugal currents of air (arrows A) through the passages, increasing the cooling effect. Drum 11 and elements 14 likely will be formed in segments and applied to the axle and wheels after assembly of the latter. Such an arrangement also facilitates renewal of brake parts if that should be necessary.

Mounted on each side of the bolster is a bracket 16 having upper and lower horizontal flanges 17, 18. Projecting transversely from the bolster are two pair of upper and lower brake carrying bars 20, 21 extending substantially horizontally from the bolster and pivoted at their inner ends to flanges 17, 18 by pins 23. The outer ends of the bars of each pair pivotally mount a brake head 24 by a pin 25 surrounded by a rubber bushing 26 in the brake head which may yield to accommodate tilting of the disk from a plane perpendicular to bars 20, 21. A brake shoe comprising a backing plate 27 and a friction element 28 opposes each brake disk friction element 14.

The inboard pair of support bars 20, 21 includes a bracket 30 mounting a fluid pressure operated cylinder 32 provided with a piston 33, the rod 34 of which is pivotally connected at 35 to the outer portion of one arm of a bell crank lever 37 pivoted at 38 to the same pair of support bars. A link 40 connects the other arm of the bell crank lever to the other pair of support bars 20, 21.

When pressure fluid is admitted at 42 to cylinder 32 and piston 33 is advanced the lever 37 moves both pairs of bars to thrust the brake shoes against the brake disk. Play of the axle and wheel assembly transversely of the truck relative to the truck side frames and bolster is readily accommodated by the pivoting of bars 20, 21 about pins 23. A coil spring 44 is compressed between piston 33 and the outer end of the cylinder and retracts the piston and brake shoes when fluid pressure is released. A stop 46 on bracket 16 limits the retraction of bars 20, 21.

Two brake assemblies may be positioned at diagonally opposite ends and sides of bolster 7, or on the same side, and each is associated with an individual wheel and axle assembly. Each brake assembly is independent of the other and failure of one brake assembly does not affect operation of the other brake assembly on the truck or of brake assemblies on the truck at the opposite end of the vehicle. Each brake head and its shoe is readily removed and replaced.

In the brake arrangement shown in FIGURES 3 and 4, the general principle of the linkage described above is retained but instead of brake shoes 50, 51 being applied to opposite sides of a single brake disk, widely spaced brake disks 52, 53 are on the wheel and axle assembly near opposite wheels 55. Each brake disk 52, 53 includes a working face 52a, 53a and lateral ribs 54 to which a cover plate 59 is applied to form with each disk a series of air passages similar to those previously described on both sides of drum flange 13. Spaced brackets 57 are mounted on bolster 58. Each bracket mounts upper and lower support bars. Bars 60 on the left hand bracket 57 carry a cylinder 62, a bell crank lever 63 and one brake head and shoe unit 50. Bars 61 carry the other brake head and shoe unit 51. Bars 60 and 61 are connected by an elongated link 65 which is adjustable lengthwise at 66 to provide proper clearance and travel of the brakes. One bracket 57 has an adjustable stop 67 controlling the release movement of the brake. Rubber bushings 68 surrounding the brake head pins 69 accommodate inclination of the brake heads relative to the brake carrying bars 60, 61.

In the structures shown in FIGURES 5 and 6, the truck wheel 70 and axle 71 assemblies, the side frames 73, the bolster 75 and other main truck parts are similar to those previously described, but the truck side frames include longitudinally extending inclined brackets 77, slidably supporting the ends of a carrier beam 78 of channel cross section extending from side to side of the truck. Support bars 80, 81 are shown as cast or forged units, each having a pair of jaws 83 receiving between them the transverse beam 78 to which the jaws are pivoted by a pin 85. Each bar 80, 81 mounts a brake head 87, 88 pinned thereto at 89 and the bars are connected by a link 90 corresponding to link 65 in FIGURE 3. Bar 81 also mounts the cylinder 92 and a bell crank lever 94, similar to the arrangements previously described. Carrier beams 78 are slidable lengthwise of bracket 77. Hence the pivots 85 for support bars 80, 81 are not fixed relative to the bolster as are the pivots of the support bars in the previous forms of the invention. Accordingly, and to provide an anchor for the brake gear, the carrier beams at opposite sides of the bolster are connected by rigid links 96, each pinned at 97 to the end portions of the beams 78. This arrangement provides for some movement of the two brake carriers lengthwise of the truck.

In the structure shown in FIGURES 7 and 8 the wheel, axle, brake disks, side frame, bolster, brake cylinder, bell crank lever and brake shoes correspond generally to those previously described, particularly as shown in FIGURE 3, but the brake gear support bars 100, 101 differ from those previously described particularly in being substantially deeper at their inner ends and having terminals 102, 103 extending over the top of and below the bottom of bolster 105 and lapping the corresponding terminals 107, 108 of the arms extending in the opposite direction for mounting the brake gear applied to the disks on the other axle. Bearings 110, 112 are seated in the top and bottom walls of the bolster and a common pivot pin 114 extends from top to bottom of the bolster through bearings 110, 112 and the support bar terminals, being held in place by a castellated nut 116, threaded on the upper end of the pin, and a locking cotter 117. A compressible bushing 119 between the bottom of the bolster and lower bearing collar 112 avoids undue play between the support bars and the bolster. Adjustable stops 121 limit the release movements of the support bars.

This type of brake gear mounting provides increased stability for the brake gear. The arms are shown as castings but may consist of forgings or built up structures.

Each form of the invention includes an extension E on the bell crank arm to which the cylinder piston rod is connected, to which a hand brake rod may be connected, the other end of the rod being provided with a chain and hand brake shaft drum (not shown) disposed at a convenient point on the vehicle body, as is usual practice to move the bell crank arm as indicated by the arrow HB.

All forms of the invention have a common basic linkage through which braking forces are applied to the disks in much the same manner and attaining the general objectives of the invention and possessing the advantages set forth on page 5. The number of pins, links and connections is substantially less than in the usual brake gear assembly, particularly those involving connections to operating cylinders and pistons mounted on the vehicle underframe. All the brake gear parts are reversible and no rights and lefts are required, thus facilitating the stocking of repair parts.

The details of construction may be varied substantially, and may be varied otherwise than as shown, without departing from the spirit of the invention, and the exclusive use of those modifications coming within the scope of the claims is contemplated.

I claim:
1. Brake structure for a pair of railway truck wheeled axles spaced apart and journalled in truck side frames and each having brake disks fixed thereon, comprising a pair of elongated cross beams with their ends disposed to be slidably supported on the truck side frames, a pair of brake support bars pivoted on each of said cross beams and extending transversely therefrom, a lever fulcrumed on the swinging portion of one bar of each pair of support bars, a brake shoe on the swinging portion of each bar, a fluid pressure cylinder mounted on one bar of each pair of bars and provided with a piston operatively connected to one arm of the lever mounted on that bar, a tie pivotally connected at one end to the other arm of said lever and pivotally connected at its other end to the outer end of the other bar of that pair of bars, and links between the end portions of each cross beam and the corresponding portions of the other cross beam for holding the beams against tilting in a vertical plane extending lengthwise of the structure.

2. In a railway truck having spaced axles with wheels at the ends thereof and having truck side frames supported from said axles, there being a brake disk adjacent each wheel and rotating therewith, an individual cross beam associated with each axle and its wheels and slidably supported at its ends on brackets on the truck side frames, said brackets being inclined upwardly lengthwise of the truck toward the adjacent wheels, brake carrying bars pivotally connected to each of said cross beams and similarly inclined therefrom upwardly alongside the associated wheels and provided with brake friction elements at their outer ends opposite to associated brake disks, a lever mounted on one bar adjacent each axle, a fluid pressure cylinder mounted on said bar and having a piston connected to one arm of said lever, a link connecting the other arm of said lever to the other bar associated with the same axle, and horizontally disposed struts extending between end portions of said cross beams and pivotally connected thereto.

3. In a railway truck having an axle with wheels at the ends thereof and having truck side frames supported from the axle and having brackets extending generally lengthwise of the side frames, there being an individual brake disk adjacent each wheel and rotating therewith, a cross beam extending between said side frames with its ends slidable along said brackets lengthwise of the side frames, a pair of brake carrying bars each pivoted to said cross beam and extending from the cross beam alongside of a respective wheel and disk, a brake shoe mounted on the end of each of said bars opposite to the adjacent disk, a lever having a fulcrum support on a swinging portion of one of said bars and spaced from the brake shoe mounting end thereof, a link pivoted at one end to a swinging portion of said lever and at its other end to the other of said bars, and a fluid pressure cylinder secured to the bar mounting said lever and provided with a piston operatively connected to another portion of said lever to thrust the brake shoes in opposite directions toward respective disks.

References Cited by the Examiner

UNITED STATES PATENTS

| | | | |
|---|---|---|---|
| 2,479,085 | 8/49 | Schrage | 188—59 |
| 2,791,294 | 5/57 | Bachman | 188—59 |
| 2,856,038 | 10/58 | Busch | 188—218 |
| 2,866,524 | 12/58 | Flesch | 188—205 |
| 2,869,688 | 1/59 | Busch | 188—218 |
| 2,911,070 | 11/59 | Seelig | 188—59 |
| 2,947,384 | 8/60 | Busch | 188—59 |
| 2,955,679 | 10/60 | Herbert | 188—59 |
| 2,972,314 | 2/61 | Herbert | 188—59 |
| 3,092,211 | 6/63 | Herbert | 188—59 |

FOREIGN PATENTS 298,070    3/29    Great Britain.

ARTHUR L. LA POINT, *Primary Examiner.*

A. JOSEPH GOLDBERG, T. GRAHAM CRAVER, EUGENE G. BOTZ, *Examiners.*